Dec. 2, 1952 N. B. HEDLEY 2,620,224
VEHICLE CURTAIN CONSTRUCTION
Filed Sept. 27, 1949 6 Sheets-Sheet 1
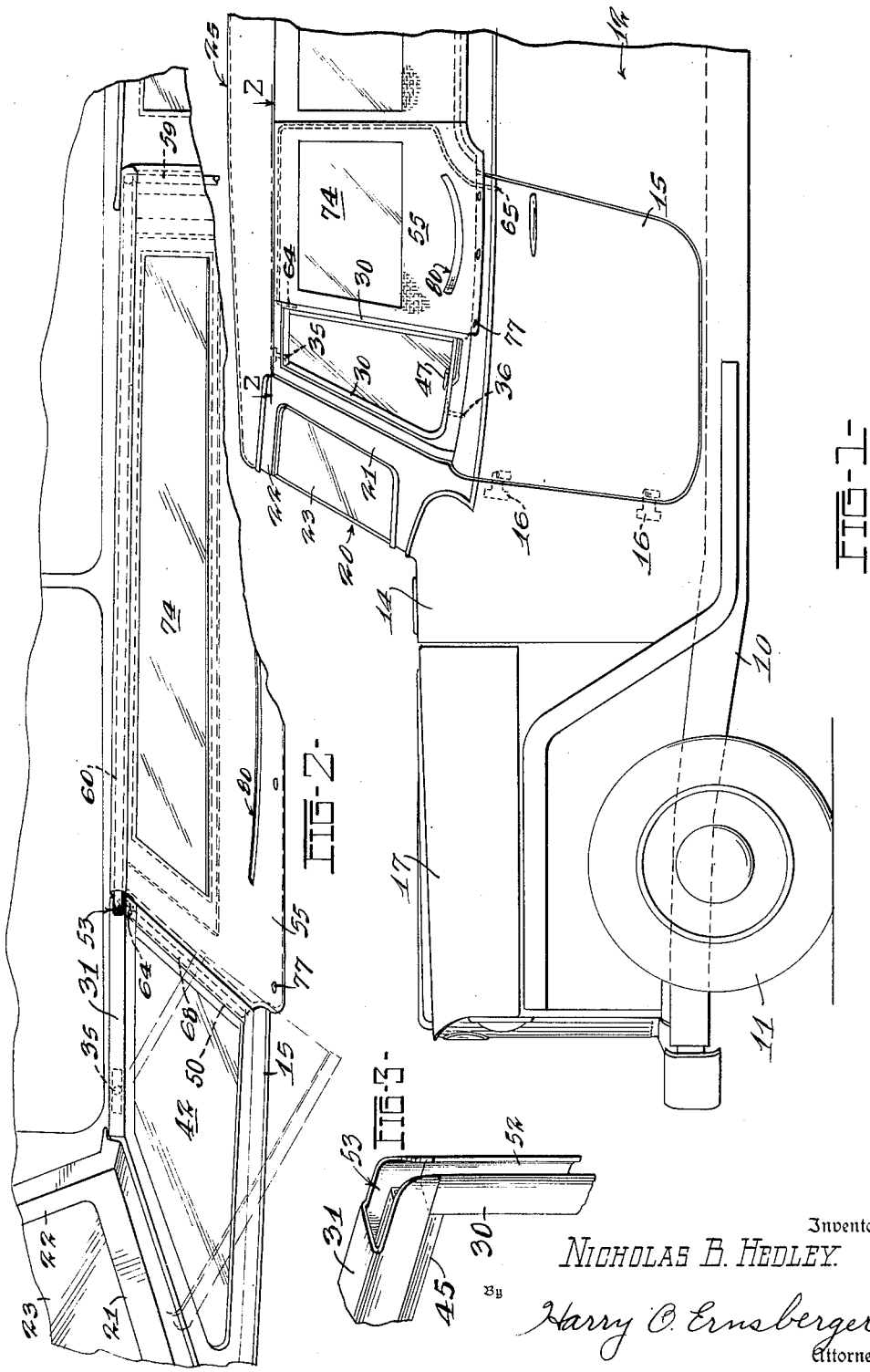
Inventor:
NICHOLAS B. HEDLEY.
By Harry O. Ernsberger
Attorney Dec. 2, 1952 N. B. HEDLEY 2,620,224
VEHICLE CURTAIN CONSTRUCTION
Filed Sept. 27, 1949 6 Sheets-Sheet 2
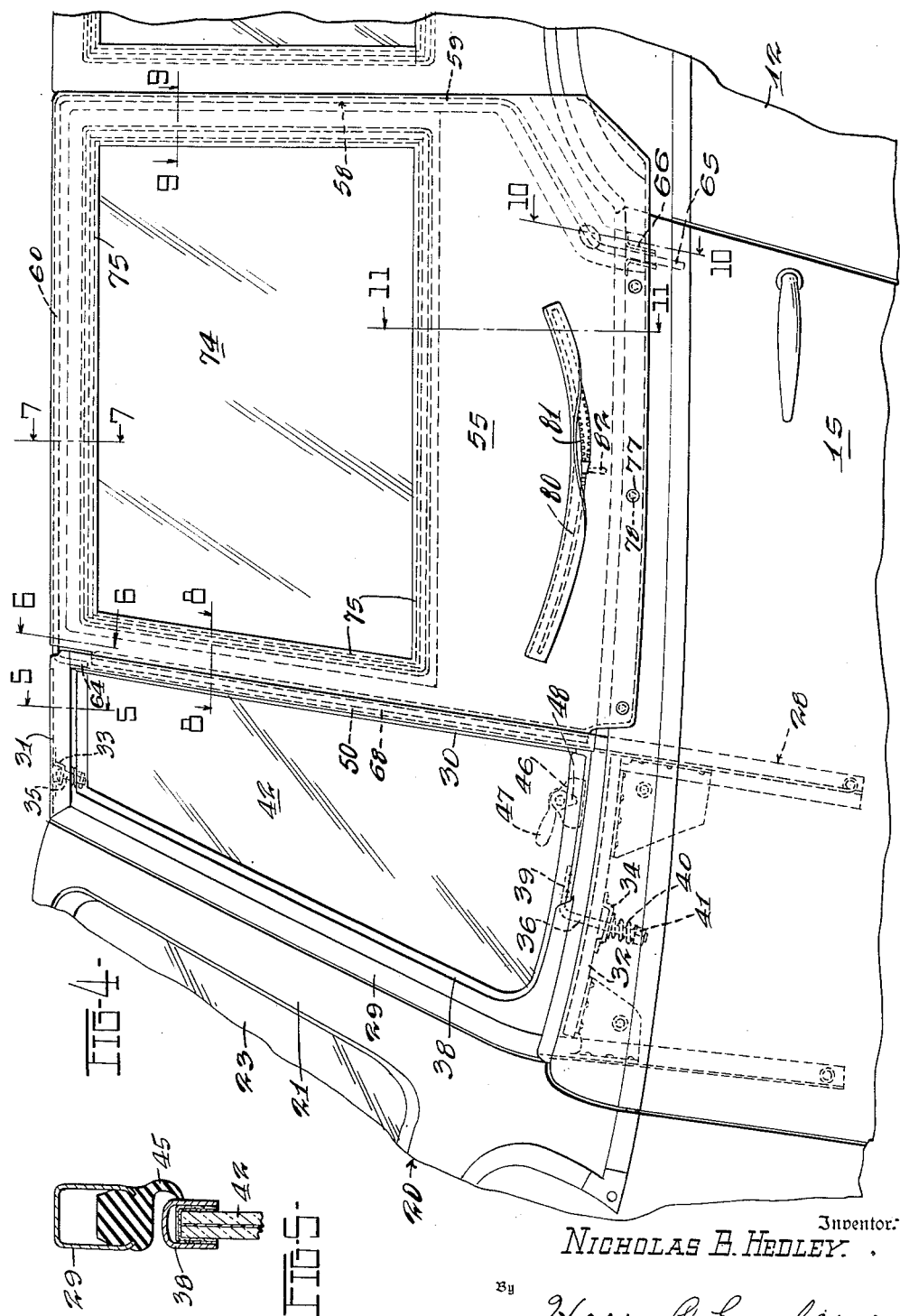
Inventor:
NICHOLAS B. HEDLEY
By Harry O. Ernsberger
Attorney

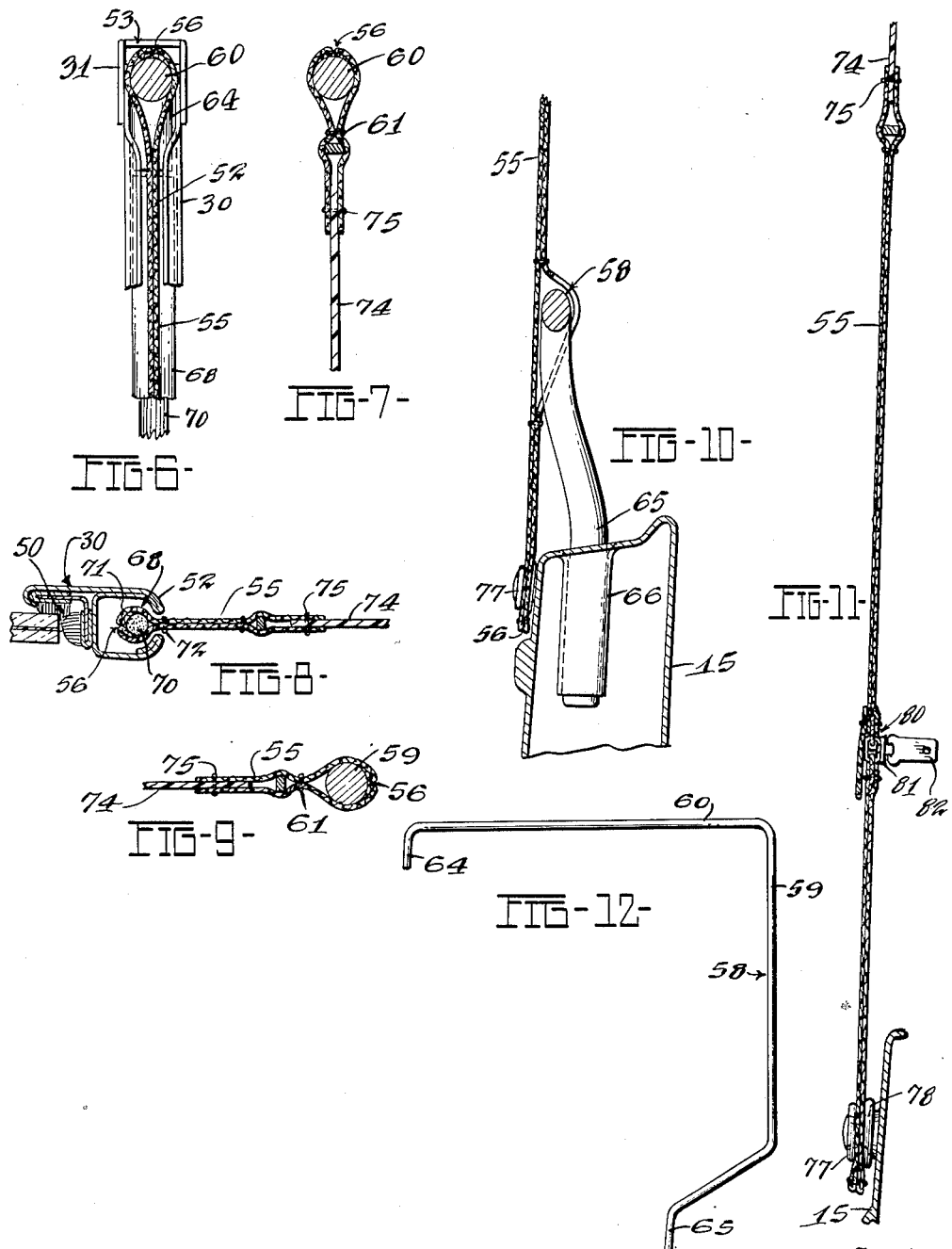

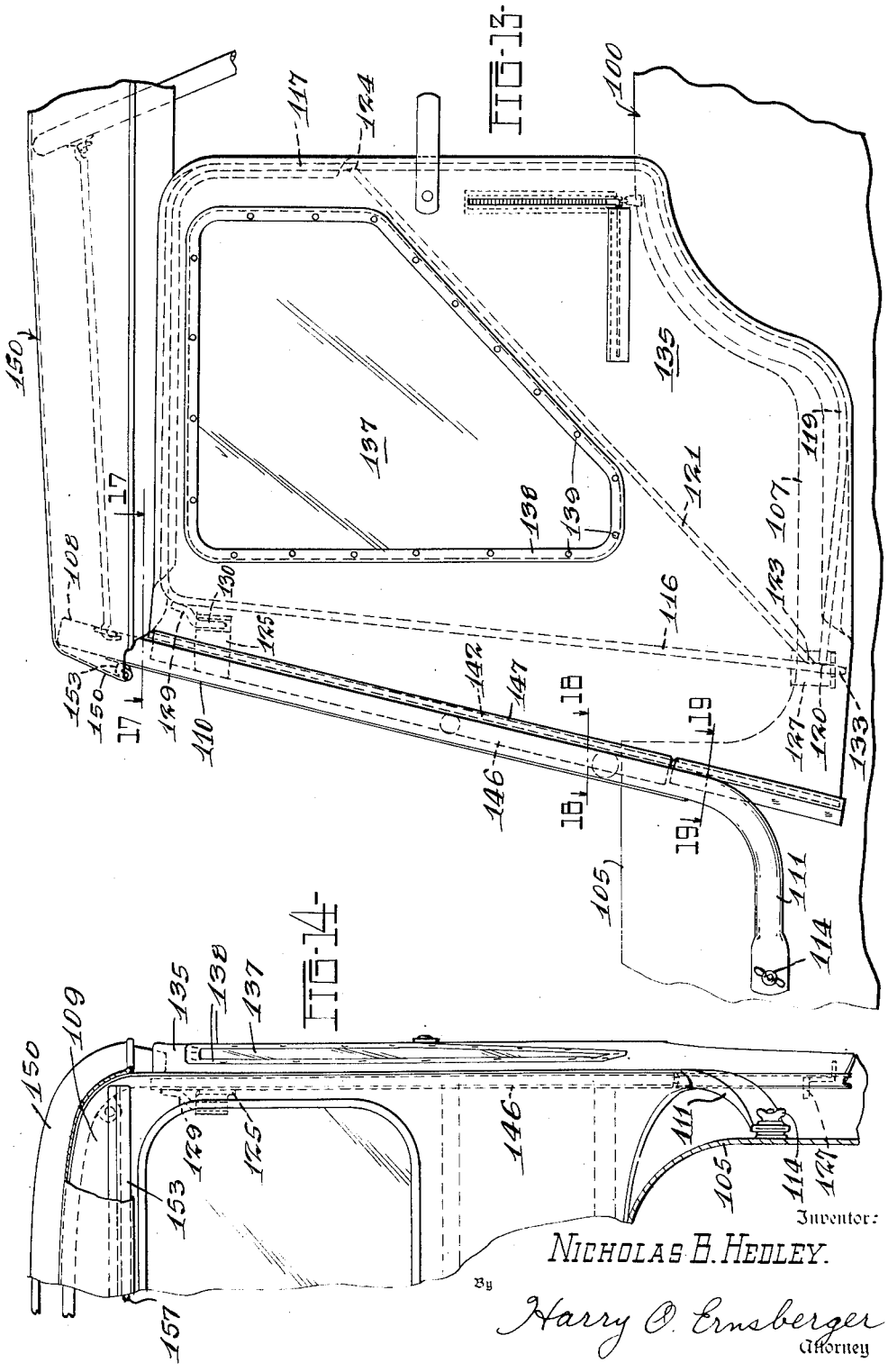

Dec. 2, 1952          N. B. HEDLEY          2,620,224
VEHICLE CURTAIN CONSTRUCTION
Filed Sept. 27, 1949          6 Sheets-Sheet 5
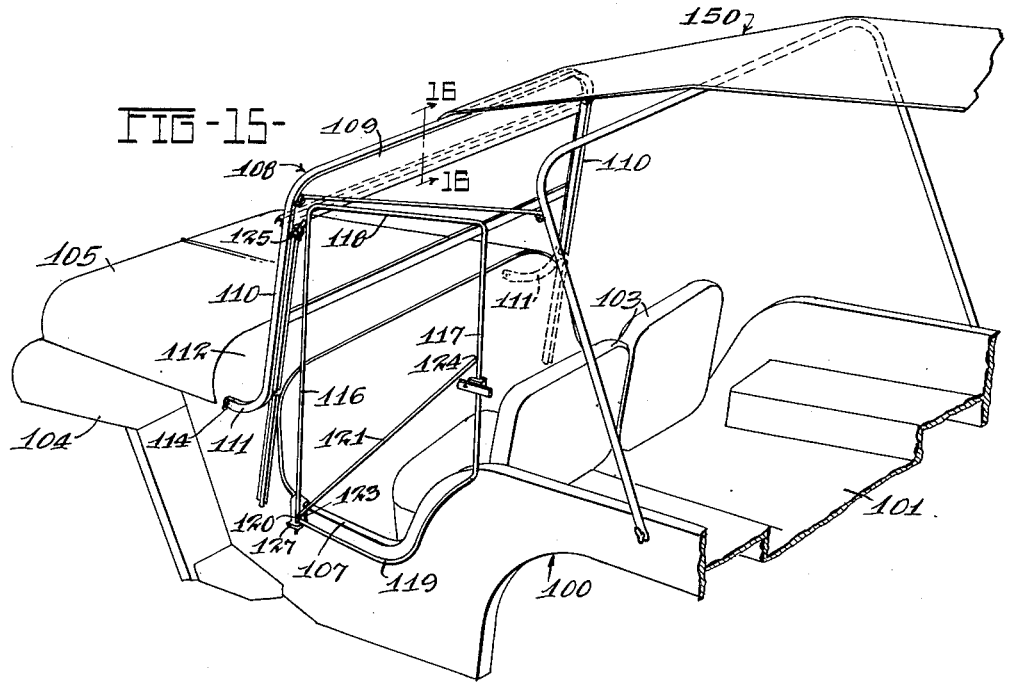
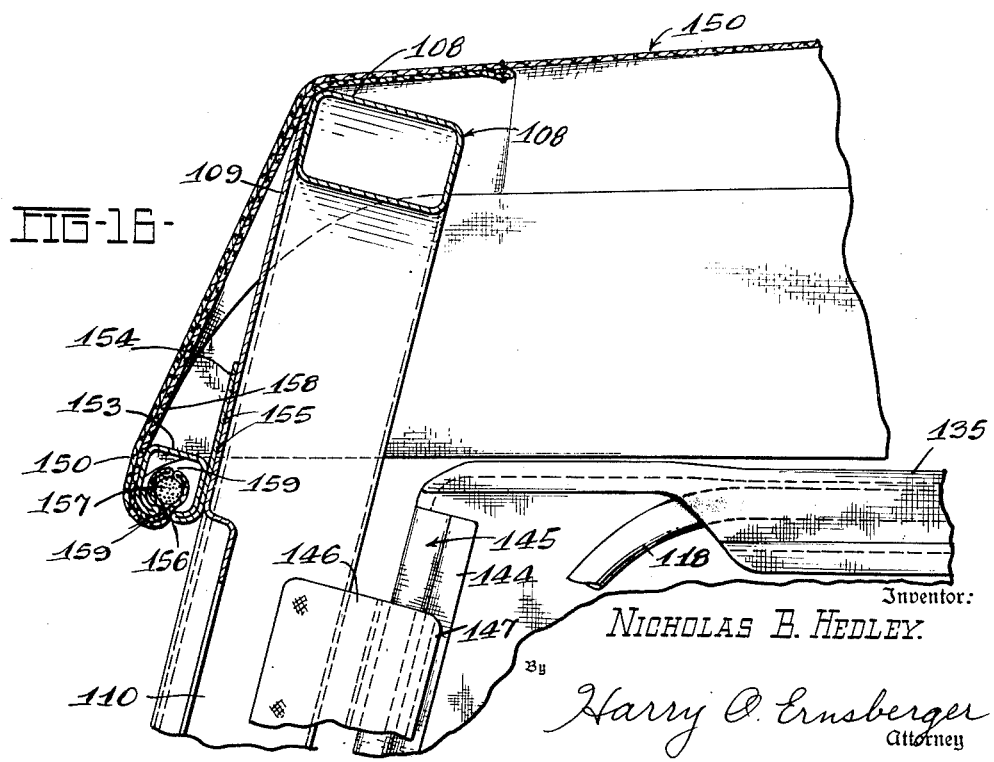
Inventor:
NICHOLAS B. HEDLEY.
By Harry O. Ernsberger
Attorney Dec. 2, 1952 N. B. HEDLEY 2,620,224
VEHICLE CURTAIN CONSTRUCTION
Filed Sept. 27, 1949 6 Sheets-Sheet 6
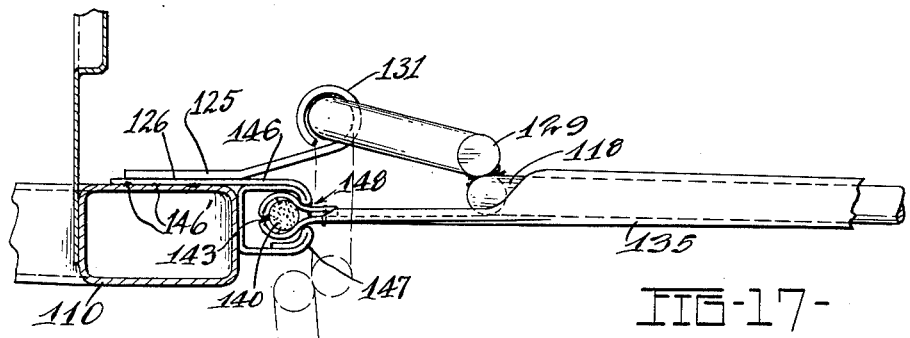
FIG-17-
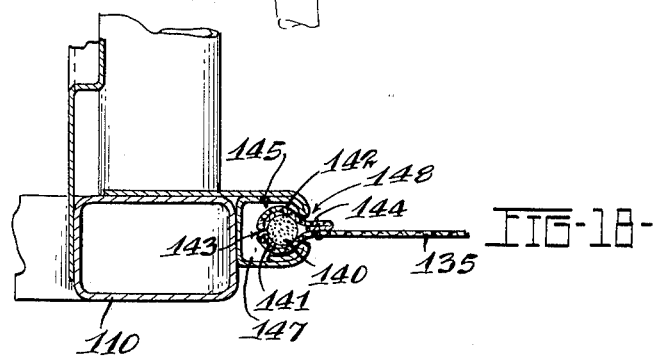
FIG-18-
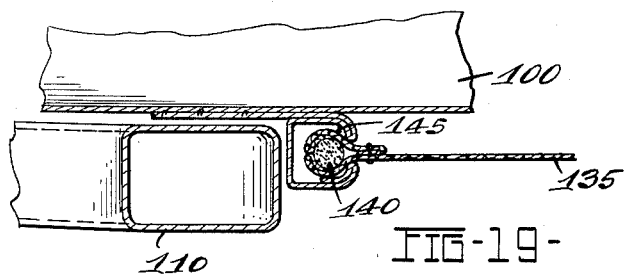
FIG-19-
Inventor:
NICHOLAS B. HEDLEY.
By
Harry O. Ernsberger
Attorney Patented Dec. 2, 1952

2,620,224

UNITED STATES PATENT OFFICE 2,620,224

VEHICLE CURTAIN CONSTRUCTION

Nicholas B. Hedley, Lewiston, Mich., assignor to Willys-Overland Motors, Inc., Toledo, Ohio, a corporation of Delaware Application September 27, 1949, Serial No. 117,983

12 Claims. (Cl. 296—139)

1

This invention relates to vehicle body, door and top components and their method of assembly and more especially to fabric panels forming elements of vehicle door and top constructions and the method and arrangement of assembling the fabric panels in their proper relation to metal parts of the vehicle body and doors.

The invention embraces the provision of fabric panel components for vehicle body and door constructions provided with means for simply and effectively anchoring the fabric panels to metal portions of the vehicle.

An object of the invention resides in the provision of a reinforced enlarged edge or bead construction formed on a fabric panel arranged for slidable interconnection or interlocking engagement with a channel configuration of a metal portion of the vehicle so that panel may be readily assembled with the channel and removed therefrom without the use of tools.

Another object of the invention resides in a novel method and arrangement of slidably securing a fabric door panel or curtain to an adjacent member to effectively complete an enclosure for a vehicle and form a weather tight joint.

Another object of the invention resides in a method and arrangement for slidably assembling a flexible or fabric top panel to a windshield frame of the vehicle in a manner forming a weather tight joint.

Another object of the invention resides in the provision of a door panel formed with an opening, the edges of the fabric bounding the opening being provided with a slide or hookless fastener to enable the vehicle operator to give appropriate signals without interfering with the panel assembly and eliminating the necessity of opening the vehicle door for signal purposes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of the forward portion of a vehicle embodying a form of the invention;

Figure 2 is an enlarged plan view along the line 2—2 of Figure 1, particularly showing the arrangement of securing a fabric door panel to a door frame member;

Figure 3 is a fragmentary isometric view illustrating a channel formation arranged to receive the edge of the fabric panel;

Figure 4 is an enlarged view of the door and ventilating window construction shown in Figure

2

1 with the fabric panel or curtain in assembled condition;

Figure 5 is an enlarged fragmentary detail sectional view taken substantially on the line 5—5 of Figure 4;

Figure 6 is an enlarged fragmentary sectional view taken substantially on the line 6—6 of Figure 4;

Figure 7 is an enlarged detail sectional view taken substantially on the line 7—7 of Figure 4;

Figure 8 is an enlarged fragmentary sectional view taken substantially on the line 8—8 of Figure 4;

Figure 9 is a sectional view taken substantially on the line 9—9 of Figure 4;

Figure 10 is a sectional view taken substantially on the line 10—10 of Figure 4;

Figure 11 is a sectional view taken substantially on the line 11—11 of Figure 4;

Figure 12 is a view of a door panel supporting member forming a part of the construction;

Figure 13 is a side elevational view showing a modified form of fabric door panel and illustrating the arrangement of the invention for securing a flexible top panel to a windshield frame;

Figure 14 is a front view showing a portion of the structure illustrated in Figure 13;

Figure 15 is an isometric view illustrating a body construction of a vehicle of the character shown in Figure 13, illustrating a form of door frame and mounting therefor and the means for securing the flexible top to the windshield frame;

Figure 16 is an enlarged vertical sectional view taken substantially in the direction of the arrows 16—16 of Figure 15;

Figure 17 is an enlarged horizontal sectional view taken substantially on the line 17—17 of Figure 13;

Figure 18 is an enlarged horizontal sectional view taken substantially on the line 18—18 of Figure 13, and Figure 19 is an enlarged detail sectional view taken substantially on the line 19—19 of Figure 13.

While I have illustrated embodiments of my invention as utilized with vehicle body and door constructions, it is to be understood that I contemplate the use of the invention with any construction wherein the same may be found to have utility.

Referring to the drawings in detail, and first with respect to the form of the invention illustrated in Figures 1 through 12 inclusive, the arrangement of the invention is illustrated as embodied in a vehicle of the character having a collapsible or foldable top construction in conjunction with flexible fabric door panel extensions or curtains. One form of vehicle construction with which my invention is incorporated is illustrated in Figures 1, 2 and 4, the vehicle having a chassis frame 10 supported by suitable road wheels 11

(only one of which is shown) the chassis supporting an open type body 12 of the tonneau type. The body is provided with a cowl portion 14 and doors 15 on each side of the vehicle which are hingedly connected to the body by means of hinges 16. The engine or prime mover (not shown) of the vehicle is enclosed within a bonnet or closure 17 disposed ahead of the body 12. Secured to the body 12 is a suitable windshield frame 20 including uprights or pillar posts 21, a header bar 22 and glazed windshield 23. In the form of vehicle illustrated, the windshield frame 20 is permanently and nonadjustably secured to the vehicle body. A top construction 25 is provided which is of the foldable or collapsible type, the same being formed of suitable waterproof fabric mounted upon bow and strut frame construction (not shown). In a position of use, the top 25 is secured by suitable means (not shown) to the windshield header or bar 22.

The upper edge of door construction 15 is aligned with the belt line of the body 12 as shown in Figures 1 and 4. Secured to the forward portion of the vehicle door 15 is a supplemental window supporting frame 28 which comprises upwardly extending members 29 and 30, an upper cross member or rail 31 and a lower cross member or rail 32. The upper and lower cross members are respectively provided with clips or brackets 33 and 34 having suitable openings to receive and accommodate hinge pintles 35 and 36. Mounted within the supporting frame 28 above the door 15 is a trapezoidal-shaped window frame 28, the pintles 36 having a laterally extending portion 39 which is fixedly secured as by welding to the frame 38 while the pintle 35 extends through an opening in the upper portion of the frame 38 whereby the frame 38 is swingable about the aligned axes of the pintles 35 and 36. A coil spring or other resilient means 40 is positioned beneath the bracket 34 and surrounds the pintle 36 being held in position by a nut 41 threaded upon the lower end of the pintle 36. The coil spring provides a frictional force between the frame 38 and the engaging surface of the lower portion of the frame with the door construction 15 so that the frame 38 will remain in any position of adjustment about the axes of pintles 35 and 36. The frame 38 supports a glazed panel 42 which is held in a suitable channel configuration of the members composing the frame. When the glazed panel 42 and its supporting frame 38 are in "closed position" as shown in Figures 1 and 4, the frame 38 contacts a rubber grommet or weather sealing strip 45 in the manner illustrated in Figure 5, thus making a weather tight joint between the window frame 38 and the supporting frame 28. The grommet 45 is coextensive with the forward and top and bottom edges of the supplemental frame 38, the grommet 38 being cemented or otherwise fixedly secured to the frame members 29, 31 and the upper forward portion of the hinged door 15. Secured to the lower right-hand corner of the supplemental frame 38 as viewed in Figure 4 is a bracket 46 to which is pivotally connected a manipulating handle 47 integrally formed with a depending projection 48 adapted for cooperation with a clip (not shown) carried by the upper portion of the door in order to lock the movable window frame 38 in closed position. The window and frame may be opened by swinging the manipulating handle 47 in a clockwise direction as viewed in Figure 4 to a vertical position, which movement disengages the projection 48 from the clip (not shown) so that the window may be swung about the axes of the pintles 35 and 36. A separate rubber grommet 50 carried by the post 30 as shown in Figure 8 serves to establish an effective sealing with the right-hand edge of the glazed panel 42 when the latter is in closed position as viewed in Figures 4 and 5.

One of the features of the present invention resides in the structure and method of removably securing a curtain or fabric panel to the door 15 so as to close the space between the door and the top 25, such curtain being arranged for movement with the door 15.

The frame member 30 is formed with a substantially vertically disposed rearwardly opening channel configuration 52 and the upper frame member 31 is configurated with an opening adjacent the channel 52 as indicated at 53 to provide for access to the channel 52 from the end. A substantially rectangularly shaped panel or curtain 55 preferably made of fabric or the like is adapted for assembly with the frame bar 30 and the door 15. The fabric panel 55 is preferably of double thickness of cloth or fabric, the thickness of fabric being sewn together at their edges as indicated at 56. A metal reinforcing bar or member 58 is provided for the curtain or panel, being formed to the configuration shown in Figure 12. The bar 58 has an upright portion 59 and a horizontal portion 60 disposed between the thickness of the panel as shown in Figures 6, 7, 9 and 10, the bar 58 being held in place between the thicknesses of fabric by means of stitching 61 particularly shown in Figures 7 and 9.

A feature of the present invention is the provision of a curtain construction capable of ready application to or removal from the door and window supporting frame. It is extremely desirable that simple yet effective means be provided for affixing the panel 55 in a position of use so that in the event of rain or inclement weather, the panel may be instantly brought into effective use so as to protect the interior of the vehicle body. To this end the rod or member 58 is formed with depending extremities 64 and 65 as particularly shown in Figures 1, 4 and 12. The upper rail of the door 15 is provided with an escutcheon or fitting 66 having an opening therein adapted to slidably accommodate the depending portion 65 of the member 58 as particularly illustrated in Figure 4. The window frame member or rail 31 is provided with a cutaway portion 53 to admit the depending portion 64 into the channel formation of the upright 30 as particularly shown in Figure 6.

It should be noted that the depending portion 64 is of comparatively short length being sufficient to establish a stable connection between the frame member 30 and the bar 58. The forward extremity of the fabric portion of the panel 55 as shown in Figure 8 is configurated or fashioned to form a raised bead portion or ridge 68 which is adapted to be slidably received in the channel portion 52 of the window frame member 30 through the opening 53. In the formation of the bead 68 there is utilized a core member 70 formed of twisted paper, cord or other suitable material, the thicknesses of fabric of the panel encircling the core 70 as illustrated in Figure 8, the fabric layers being stitched together as at 71. Immediately adjacent the core member, the layers of fabric are stitched together as indicated at 72 so as to permit the fabric layers to slidably extend into the throat of the channel configuration 52. As shown in Figure 4 the longitudinal axis of the core 70 and the bead formation 68 are in alignment with the longitudinal center or axis of the depending extremity 64 of the bar 58 so that both the bead 68 and the depending extremity 64 may be slidably received into the channel 52 in the manner shown in Figure 8.

The panel 55 is provided with a transparent section or window 74 which may be formed of flexible film-forming resins as for example, cellulose acetate, polyvinyl films or any suitable material having the characteristic of substantially permanent transparency. The transparent panel or section 74 is of a dimension so that its edge portions preferably project between the thicknesses or laminations of fabric and are sewn or stitched to the fabric as illustrated at 75 in Figures 4, 8 and 9. While I have found that a flexible resin or plastic film may be inexpensively secured in the fabric panel 55 by sewing, it is to be understood that a rigid transparent panel may be used as for example, a section of safety glass or the like by surrounding the transparent panel with a suitable metal frame and crimping or distorting portions of the frame into securing engagement with the fabric 55 in a well-known manner. I also contemplate the utilization of rigid plastic or resin films as window sections which are substantially transparent as, for example, sections of polystyrene or polymethylmethocrylate. The fabric panel 55 at its lower edge, that is the portion overlapping the upper rail of the door 15, is provided with friction securing buttons or snaps 77 which are adapted to frictionally engage over projections formed on fittings 78 as shown in Figure 11.

The fabric panel 55 is preferably formed with means to facilitate the passage of the vehicle operator's arm in order that the operator may give appropriate signals to other vehicle operators. To accomplish this the fabric portion of the panel 55 is preferably provided with a curved slit 80 adapted to be closed by a hookless fastener of the so-called zipper type as indicated at 81. The fastener may be manipulated by means of a tab or member 82 as shown in Figure 11 in the conventional manner.

The assembly of the panel or curtain 55 to the door 15 and the frame member 30 is accomplished as follows: The vehicle operator introduces the lower end or extremity of the bead 68 into the opening 53 of frame member 31 and slides the bead 68 downwardly into the channel formation 52 in the member 30. During the downward sliding movement of the bead 68 in the panel 52, the operator guides the depending extremity 65 of the bar or member 58 into the opening in the fitting 66 in the upper rail of the door and also guides the depending extremity 64 into the upper portion of the channel 52 formed in member 30. The panel 55, when completely assembled in this manner with the door 15, is in the position shown in Figures 1 and 4. After the panel has been moved downwardly with respect to the frame member 30 to its limit of movement, the friction fasteners 77 are in alignment with the fittings 78 so that these may be effectively snapped to secure the lower edge portion of the panel 55 to the door 15. In this manner the entire panel section may be quickly and easily fitted in a position-of-use. In order to remove the panel the vehicle operator loosens the friction snaps 77 and exerts an upward force upon the bar 58 thus disengaging the extremities 64 and 65 thereof from the frame member 30 and fitting 66 respectively and sliding the bead 68 upwardly until it is free of the channel formation 52. The panel or curtain 55 may then be stored in a position out of use (not shown) which may be a compartment at the rear of one of the vehicle seats. Through the employment of a removable panel of this nature it will be obvious that the same may be quickly applied to or removed from a vehicle door without the use of any tools whatever. Furthermore, the interlocking relation of the bead 68 with the channel 52 provides an exceptionally effective and efficient weathertight joint between these elements.

Figures 13 through 19 inclusive illustrate the principles of the invention applied to a vehicle having a different style of body as particularly illustrated in Figure 15. I utilize the principles of the invention in this form of vehicle for effecting a fastening means and weathertight joint between the flexible vehicle top construction and the windshield frame and in the door construction of the vehicle.

Referring first to Figure 15 the vehicle body 100 embodies a package receiving section 101 (only a portion of which is shown) a pair of seats 103, front fenders 104 (only one being shown) and a bonnet 105 forming a cover or closure for the engine compartment of the vehicle. The side panels of the body 100 are recessed or lowered as at 107 to facilitate ingress and egress of passengers into the operator's compartment of the vehicle. A windshield frame 108 is provided formed of a header bar or strip 109 secured to the transverse rail of the windshield frame, and upright portions or posts 110, the latter terminating in forwardly extending portions 111 which are pivotally joined to the cowl portion 112 by means of wing bolts 114. The windshield frame 108, being pivotally supported, may be folded forwardly over the bonnet 105 to a position out of use, if desired.

Means are provided for removably connecting and supporting a door on this form of vehicle body construction, the door construction including a skeleton frame carrying a fabric panel or the like. The skeleton door frame may be formed of rod material preferably of circular cross section and in the embodiment illustrated the frame contour is fashioned of a single rod shaped to provide upright portions 116 and 117, an upper rail 118 and a lower rail 119. The extremity of the lower rail 119 is welded or otherwise fixedly joined to the upright portions 116 as indicated at 120. The door frame is reinforced by means of a diagonally extending brace rod 121 which is welded or otherwise secured to the uprights 116 and 117 at the junctures indicated at 123 and 124. Secured to each upright 119 of the windshield frame is a bracket 125, the bracket being preferably welded to the windshield frame as indicated at 126 in Figure 17. A second bracket 127 is secured to the rail portion defining the recess 107 in the body panel as shown in Figures 13 and 14. Welded to the upper end of the upright portion 116 of the door frame is a member 129, the member 129 having an offset extension 130 forming a pintle adapted to extend into a cylindrical portion 131 formed on the bracket 125 thus providing a pivotal support for the upper part of the door frame. The upright 116 is formed with an extension 133 projecting below the juncture of transverse member 119 with the upright 116 as shown in Figure 13. The extension 133 projects into a suitable opening formed in the bracket 127 so as to provide a pivotal support for the lower portion of the door frame. It will be noted that in order to remove the door from the brackets 125 and 127 an upward movement of the door frame will disconnect the pintle 130 and the pintle projection 133 from the supporting brackets.

The skeleton frame is covered with a fabric panel 135 which is stitched, or otherwise secured to the metal frame. The panel is provided with a window opening in which is secured a transparent member 137 mounted in a supplemental sheet metal frame 138 which is secured to the fabric panel 135 by means of suitable fasteners 139. The window 137 may be glazed or formed of substantially transparent plastic or other resin material.

The forward edge portion of the fabric panel 135 is formed to partially embrace or surround a cord or bead member 140 which may be fashioned of twisted paper, fibre, metallic wire or other suitable material. A separate edging strip 142 extends substantially one half of the way around the bead 140 as shown in Figures 17 through 19, the strip being stitched or otherwise secured to the fabric panel 135 as indicated at 143 and 144. In this manner the member 140 in conjunction with the adjacent portion 141 of the panel 135 and the strip 142 forms a ridge-like portion or bead 145. The upright post or member 110 of the windshield frame construction is secured to a member 146 by means of welding 146' or other suitable securing means. The member 146 is formed to a channel configuration as indicated at 147, the channel configuration being coextensively arranged with the windshield post or upright 110 as indicated in Figures 13 and 17 through 19. As illustrated in these figures the throat or entrance 149 of the channel configuration 147 is such as will not permit the lateral passage of the bead or ridge configuration 145. The bead 145 is assembled in the channel 147 through vertical movement of the door panel 135 and its frame construction so as to slide the bead 145 into the channel 147 by downward movement of the panel 135. In this manner the bead 145 is moved or threaded into the channel, forming a weathertight seal between member 146, windshield post 110 and the fabric panel. Through this arrangement the door panel 135 and its supporting frame may be quickly affixed or removed by vertical movements of the door panel to establish the interlock of the bead 145 with the channel member 146 at the same time that the pintles or projections 130 and 133 of the door frame construction enter openings in the supporting brackets 125 and 127 to the assembled position as shown in Figure 13. By this means the door may be quickly placed in operative position or removed from engagement of the vehicle without the use of tools and in a minimum of time.

Figures 15 and 16 illustrate the principles of my invention utilized in securing a flexible top 150 to a header bar or strip 109 forming a part of the windshield frame 110. The top 150 may be of any flexible material as for example, waterproof fabric, or other flexible waterproof material. As particularly illustrated in Figure 16 the top panel 150 overlies the upper edge of the transverse rail of the windshield frame and extends downwardly adjacent a header bar or strip 109. Secured to the header strip 109 is a member 153 of channel-shaped configuration having an extended portion 154 which is welded or otherwise secured to the header bar 109 as indicated at 155. The opening 156 of the channel-shaped member 153 is at the lower side of the member so that the flexible panel 150 extends downwardly and partially around the forward portion of the channel-shaped member 153. Secured adjacent the edge of the fabric 150 is a cord 157 of substantially circular cross section formed of twisted paper, compressed fibers or the like which is secured between the panel 150 and a supplemental fabric strip 158 by means of stitching 159, the stitching serving to hold the cord 157 in place and providing an enlarged bead on the fabric panel. The bead construction formed by the adjacent portions of the panel 150 and supplemental strip 158 surrounding the cord 157 is adapted to be slidably inserted longitudinally in the channel formation of the member 153 so as to provide a simple yet effective weatherproof juncture between the fabric panel 150 and the channel-shaped member 153. By means of this type of connection between a fabric top and a windshield frame the top construction may be readily assembled and disassembled with the windshield frame construction without the use of any tools. Due to the fact that the fabric panel and the fabric strip 158 lie in tension relation adjacent the exterior front wall of the channel-shaped member 153 a weathertight seal is effected so that water and snow cannot enter between the header strip 109 and the fabric panel.

From the foregoing it will be seen that in all forms of the invention there is provided a simple yet effective connection or juncture of a flexible or fabric panel with a channel-shaped metal member which provides an effective weatherseal, the interlocking connections being of such a nature that the panels may be quickly and easily applied or removed without the use of tools.

It is apparent that, within the scope of the invention, modifications and different arrangements may be made other than is herein disclosed, and the present disclosure is illustrative merely, the invention comprehending all variations thereof.

What I claim is:

1. In a combination with a vehicle body; a door pivotally connected to the body; a window frame carried by the door having a channel-shaped configuration formed therein; a curtain panel; a frame for said panel adapted to be removably supported on said door and window frame; one edge of said panel being formed with a longitudinally extending bead; said bead adapted for slidably interlocking engagement with the channel-shaped portion of said window frame providing a weathertight connection between said panel and said window frame.

2. In combination with a vehicle body; a door pivotally connected to the body; a member carried by the door and having a channel-shaped configuration formed therein; a panel; a frame for said panel and adapted to be removably supported on said door; said panel being formed with a longitudinally extending bead; said bead being adapted for slidable interlocking engagement with the channel-shaped portion of said member providing a weathertight connection between said panel and member.

3. In combination with a vehicle body; a door pivotally connected to the body; a window frame fixedly supported on the door and having a channel-shaped configuration formed therein; a fabric curtain; a frame associated with said curtain and adapted to be removably mounted on said door; one edge of the curtain being formed with a longitudinally extending bead; said bead being adapted for slidable interlocking engagement with the channel-shaped portion of said window frame providing a weathertight connection between said curtain and said window frame.

4. In combination with a vehicle body having a windshield frame; said windshield frame including a member having a channel-shaped configuration; a door construction swingably supported on the body and having a panel formed of flexible material; one edge of the flexible panel being formed with a bead; said bead adapted for slidable interengagement in the channel-shaped configuration of said member.

5. In combination with a vehicle body having a windshield frame; said windshield frame including a member having a channel-shaped configuration; a door construction including a metal frame, a flexible panel carried by said metal door frame; said door frame being pivotally carried by said windshield frame and the body; one edge of the flexible panel being formed with a bead; said bead adapted for slidable interengagement in the channel-shaped configuration of said windshield frame member.

6. In combination with a vehicle body having a channel-shaped member associated therewith; a door frame pivotally associated with the body; said door frame supporting a flexible fabric panel; a core member of substantially circular cross section secured to said flexible fabric panel being arranged for slidable interlocking in said channel-shaped configuration for establishing a weathertight juncture between the flexible panel and the channel-shaped member.

7. A door construction for use with a vehicle body including a metal door panel; a main window frame mounted on said metal door panel; a supplemental window frame carrying a transparent glazed panel pivotally supported in said main window frame; a curtain panel; an enlarged bead formed on said curtain panel; said main window frame being formed with a channel-shaped configuration; said bead being adapted for slidable interlocking engagement with the channel-shaped configuration on said main window frame for establishing a weathertight connection between said main window frame and said curtain panel when the latter is in assembled relation with the metal door panel.

8. A door construction for use with a vehicle body including a metal door panel; a main window frame including a member having a channel-shaped configuration secured to said metal door panel; a supplemental window frame carrying a glazed panel pivotally supported in said main window frame; a fabric curtain panel; a rod-like frame associated with said curtain panel; a core member of substantially circular cross section secured to said fabric panel said curtain frame being removably carried by said door panel; said core member and adjacent portion of the panel being arranged for slidable interlocking engagement with the channel-shaped configuration on said main window frame for establishing a weathertight connection between said main window frame and said fabric panel when the latter is in assembled relation with the metal door panel.

9. In combination with a vehicle body formed with an upstanding member of channel-shaped configuration in cross section; a door frame of skeleton metallic construction pivotally and removably associated with the body; a fabric panel secured to said skeleton door frame; one edge of said panel being formed with a bead adapted for slidable interengagement with the channel-shaped configuration on the upstanding member carried by the body; said bead including a cord of substantially circular cross section secured adjacent the edge of said fabric panel; said fabric panel being formed with an opening, and a slidable hookless fastener for closing the opening in said panel.

10. A door construction for use with a vehicle body including a metal door panel; a main window frame having a channel-shaped configuration secured to said metal door panel; a supplemental window frame carrying a transparent glazed panel pivotally supported in said main window frame; a fabric curtain panel; a rod-like frame associated with said panel; a cord of substantially circular cross section secured to said fabric panel, said curtain frame being removably carried by said door panel; said cord being arranged for slidable interlocking engagement with the channel-shaped configuration on said main window frame for establishing a weathertight connection between said main window frame and said fabric panel when the latter is in assembled relation with the metal door panel.

11. In combination with a vehicle body, a door frame pivotally mounted upon the body; a channel-shaped member disposed adjacent the door frame; a flexible fabric panel adapted to be supported upon and movable with the door frame; a core member of substantially circular cross-section secured along one edge of said flexible fabric panel and being arranged for slidable interlocking engagement in the channel configuration of said member for establishing a weathertight juncture between the flexible panel and the channel-shaped member.

12. In combination with a vehicle body, a door frame pivotally supported upon the body; a flexible fabric panel disposed adjacent the door frame; said door frame including a substantially horizontally extending metal rod, said flexible fabric panel having a loop portion formed adjacent its upper edge and adapted to receive the horizontally extending metal rod whereby the fabric panel is supported thereby; a channel-shaped member disposed adjacent the door frame, said flexible fabric panel having a ridge formed along one edge thereof and arranged for slidable interlocking engagement in the channel configuration of said member for establishing a weathertight joint between the flexible panel and the channel-shaped member.

NICHOLAS B. HEDLEY.

REFERENCES CITED

The following references are of record in the file of this patent:

UNITED STATES PATENTS

| Number | Name | Date |
|---|---|---|
| 416,664 | Brandenburg | Dec. 3, 1889 |
| 1,281,571 | Holt | Oct. 15, 1918 |
| 1,322,650 | Sundback | Nov. 25, 1919 |
| 1,538,759 | Thomas | May 19, 1925 |
| 1,638,334 | Harris | Aug. 9, 1927 |
| 1,757,860 | Hall et al. | May 6, 1930 |
| 1,874,867 | Bishop | Aug. 30, 1932 |

FOREIGN PATENTS

| Number | Country | Date |
|---|---|---|
| 207,683 | Great Britain | Dec. 6, 1923 |
| 235,403 | Great Britain | June 18, 1925 |